W. K. LORENZ.
Machine for Dressing and Ornamenting Marble, Slate, &c.

No. 209,062.   Patented Oct. 15, 1878.

WITNESSES:
Henry N. Miller
C. Sedgwick

INVENTOR:
W. K. Lorenz
BY Munn & Co
ATTORNEYS.

UNITED STATES PATENT OFFICE.

WILLIAM K. LORENZ, OF TOLEDO, OHIO.

IMPROVEMENT IN MACHINES FOR DRESSING AND ORNAMENTING MARBLE, SLATE, &c.

Specification forming part of Letters Patent No. 209,062, dated October 15, 1878; application filed June 22, 1878.

*To all whom it may concern:*

Be it known that I, WILLIAM K. LORENZ, of Toledo, in the county of Lucas and State of Ohio, have invented a new and Improved Machine for Dressing and Ornamenting Marble, Slate, and Similar Material, of which the following is a specification:

My invention relates to machines for dressing the surface and edge of marble or other slabs; and it consists in a rotary tool made in parallel sections, connected together by screws, and adjustably held on a shaft by a key, as will be hereinafter more fully set forth.

Figure 1:
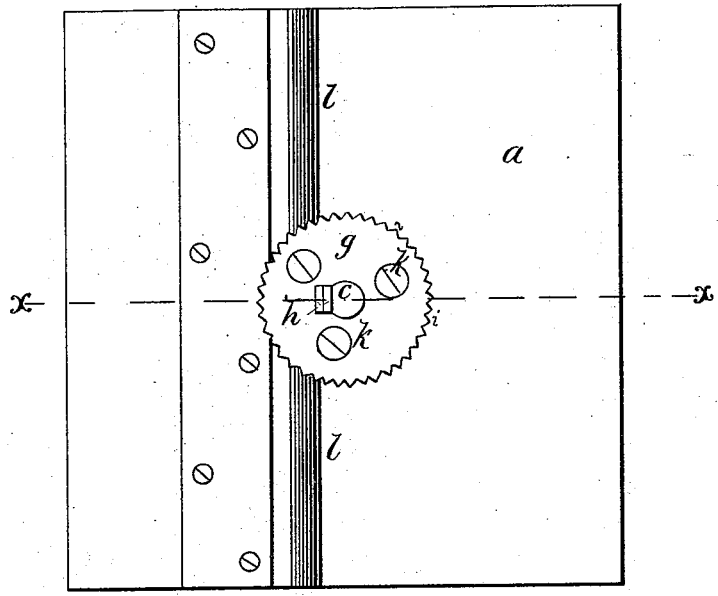
Figure 2:
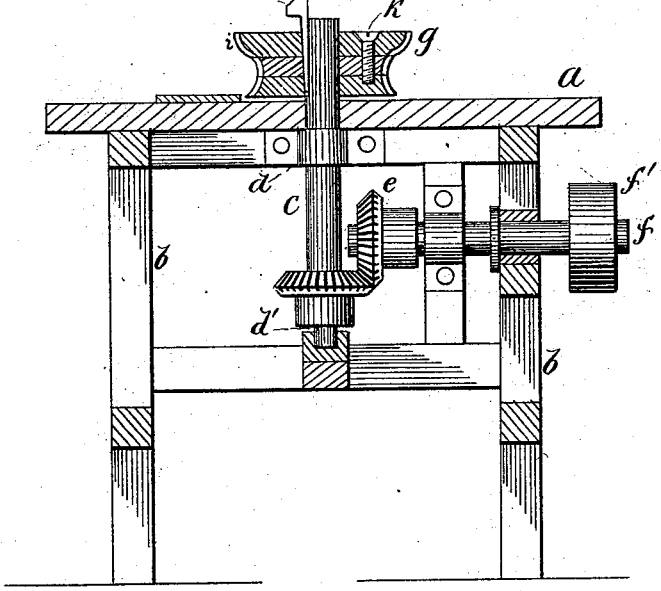

In the drawings, Figure 1 is a plan of my machine, and Fig. 2 a cross-section of the same at the line $x\ x$.

Similar letters of reference indicate corresponding parts.

$a$ represents a table or bed, mounted upon a frame, $b$, and carrying a vertical shaft, $c$, supported in bearings $d\ d'$. This shaft $c$ is revolved by the bevel-gear $e$ on a horizontal shaft, $f$, carrying a pulley, $f'$, for connection to suitable power; or it may be revolved in any other suitable manner.

The bed $a$ may be fixed, and the material to be operated upon moved upon it; or the bed may be constructed to slide on ways and carry the slab.

The shaft $c$ extends above the table $a$, to form an arbor for the cutting or grinding tool or wheel $g$, which is secured to the shaft $c$ by a key, $h$.

The wheel or tool $g$ is made with indentations or serrations on its edges or face, as seen at $i$; and I have shown the wheel $g$ in three portions, held together by screws $k$, so as to form one wheel with a compound curved edge. These sections may be used singly or in combination, and any desired form given to the edge of the slab.

The wheel $g$ is held to the shaft $c$ by a key, $h$, and may be adjusted up and down on the shaft to suit the thickness of the slab to be operated upon. The shaft $c$ may be adjusted vertically for the same purpose by making the bearing $d'$ capable of movement up or down by screws or a lever.

The wheel or tool $g$ is to be revolved rapidly by competent power, and the slab to be dressed or ornamented is moved in contact with the indentations $i$ on the wheel, which grind or abrade the slab to form the desired ornamentation or molding.

The slab moves against a guide, $l$, on the table $a$, which guide $l$ may be made adjustable to regulate the depth of the cut.

When this machine is used for dressing the surface of a slab, the shaft $c$ may be horizontal, so that the slab will be moved upon the bed $a$ under the cutting-edge of the wheel; and it is sometimes desirable to suspend the wheel or tool $g$ above the bed by a shaft in bearings above the table, and also to have the bed $a$ adjustable to and from such wheel, to adapt it to the thickness of the material.

The table $a$ and frame $b$ may be made of metal, and in any convenient form; or the table may be of wood, with a metal face for the slab to rest upon.

Slabs or blocks of marble, slate, stone, or other material may be dressed or ornamented with this machine, and their edges rounded and molded to adapt the slabs for use as table and bureau tops, or for other purposes.

I do not limit myself to the shape or size of the wheel or tool, or the serrations upon the same; neither do I confine myself to the form and construction of table described, as these may be varied without departing from the essential features of my invention.

The teeth of the wheel or tool may be movable, and made of carbon or diamond, for working in very sharp stone.

I am aware that it is not new in wood-working to use a rotating tool composed of two or more circular saws fastened on one shaft, and I do not claim such, broadly, as my invention.

Having thus fully described my invention, I claim as new and desire to secure by Letters Patent—

The rotary tool $g$ of a stone or slate dressing machine, made in parallel sections, connected together by screws $k$, as shown and described, so that each section may be sharpened separately, and adjustably held on the shaft $c$ by the key $h$, all substantially as and for the purposes herein set forth.

WILLIAM KARL LORENZ.

Witnesses:
 CASPAR WEBER,
 R. WEBER.